United States Patent [19]

Zikeli

[11] Patent Number: 5,603,883
[45] Date of Patent: Feb. 18, 1997

[54] PROCESS OF AND APPARATUS FOR MAKING CELLUOSE PRODUCTS

[75] Inventor: Stefan Zikeli, Regau, Austria

[73] Assignee: Lenzing Aktiengesellschaft, Austria

[21] Appl. No.: 465,321

[22] Filed: Jun. 5, 1995

[30] Foreign Application Priority Data

Apr. 19, 1995 [AT] Austria ........................ 674/95

[51] Int. Cl.⁶ .............................. B29C 47/00; D01F 2/02
[52] U.S. Cl. ................... 264/187; 162/70; 162/81; 162/157.6; 162/234; 162/261; 425/376.1; 425/382.2; 425/461; 425/464
[58] Field of Search .................... 264/187, 203; 425/376.1, 382.2, 461, 464; 162/70, 81, 157.6, 234, 261

[56] References Cited

U.S. PATENT DOCUMENTS

| | | | |
|---|---|---|---|
| 2,179,181 | 4/1937 | Graenacher | 106/203 |
| 4,246,221 | 1/1981 | McCorsley, III | 264/203 |
| 5,094,690 | 3/1992 | Zikeli et al. | 106/198 |

FOREIGN PATENT DOCUMENTS

| | | |
|---|---|---|
| 914674 | 11/1972 | Canada . |
| 356419 | 2/1990 | European Pat. Off. . |
| 2011493 | 10/1970 | Germany . |
| WO93/12930 | 9/1993 | WIPO . |
| WO94/06530 | 3/1994 | WIPO . |
| WO94/28212 | 12/1994 | WIPO . |
| WO95/07811 | 3/1995 | WIPO . |

OTHER PUBLICATIONS

Heimgartner, E., "Devolatilisation of Plastics", Ingenieurwissen, pp. 69–97 (1980).

Primary Examiner—Leo B. Tentoni
Attorney, Agent, or Firm—Brumbaugh, Graves, Donohue & Raymond

[57] ABSTRACT

A plant for the production of cellulose films and fibers includes at least one pulping device for producing a first suspension of pulp in an aqueous amine-oxide solution and a first thin-film treatment apparatus for receiving the first pulp suspension and producing a concentrated pulp suspension. The plant also includes a second thin-film treatment apparatus wherein the concentrated pulp suspension is transformed into a mouldable solution of cellulose and a spinning device connected to the second thin-film treatment apparatus, wherein the mouldable cellulose solution is processed into cellulose films and fibers. A process for the production of cellulose films and fibers according to an amine-oxide process includes the steps of suspending pulp in an aqueous amine-oxide solution to produce a first suspension, concentrating the first suspension, producing a mouldable cellulose solution by heating, and processing the solution to form cellulose films and fibers.

28 Claims, 2 Drawing Sheets

PROCESS OF AND APPARATUS FOR MAKING CELLUOSE PRODUCTS

BACKGROUND OF THE INVENTION present invention is concerned with a plant for the production of cellulose films, fibres, membranes or other moulded bodies according to the amine-oxide process, and an integrated film and fibre plant. Further, the present invention is concerned with a process for the production of cellulose films, fibres, membranes etc. according to the amine-oxide process.

From U.S. Pat. No. 2,179,181 it is known that tertiary amine-oxides are capable of dissolving cellulose and that from these solutions cellulose moulded bodies may be produced by precipitation in an aqueous medium. For the purposes of the present specification and claims, such a process is referred to as "amine-oxide process".

From U.S. Pat. No. 4,246,221, an amine-oxide process for the production of mouldable cellulose solutions using as starting material, among other substances, a mixture of cellulose in aqueous N-methylmorpholine-N-oxide (NMMO) is known. The known process is carried out discontinuously, presenting the following 4 steps for obtaining the mouldable solution:

1. processing a mixture of pulp containing approximately 6% by mass of water in an aqueous solution of NMMO in a mixing vessel by subjecting the mixture to reduced pressure and elevated temperature, a first solution being produced,
2. intermediately storing the first solution in a tank,
3. intermediately filtering said solution and
4. processing said first solution in an extruder to obtain the mouldable solution.

According to this process, cellulose may be dissolved only discontinuously, which moreover is very time-consuming. The first step already takes 1 hour and 20 minutes. In this period of time, the pulp is exposed to the amine-oxide solution at a temperature of more than 100° C., which leads to a significant degradation of the cellulose and the amine-oxide and to undesired by-products, deteriorating the properties of the produced fibres. Moreover, the big amount of amine-oxide processed per batch implies the risk of explosions, due to the thermal instability of the amine-oxide and degradation of the polymerisation degree of the cellulose may occur.

On the other hand, EP-A-0 356 419 published in 1990 describes a technique whereby it was possible to overcome the multi-step extruder technique, as for instance described in U.S. Pat. No. 4,246,221, and transform a suspension of cellulose in an aqueous solution of an amine-oxide into a mouldable solution continuously and even in one single step. According to this technique, first the suspension is spread like a layer on a heating surface while being intensively mixed and treated by transporting it, while intensively mixing it, across the heating surface, the layer heating up. Simultaneously, the layer is subjected during the treatment to a reduced pressure in such a way that water evaporates and those concentration conditions are adjusted which according to the phase diagram for the ternary substance mixture cellulose/amine-oxide/water (see e.g. WO94/28212) allow for the cellulose to dissolve.

The thin-film treatment process described above conveniently is carried out in an apparatus as illustrated in EP-A-0 356 419. This apparatus is called a thin-film treatment apparatus. An embodiment of a thin-film treatment apparatus is for instance a so-called FILMTRUDER®, as manufactured by the company Buss AG (Switzerland). A thin-film treatment apparatus is also described in DE-OS 2 011 493.

WO 94/06530 published in 1994 uses the thin-film technique known from EP-A-0 356 419 to obtain a mouldable solution from a mixture of cellulose in an aqueous solution of a tertiary amine-oxide. The process is carried out in a FILMTRUDER®, analogously to an embodiment described in EP-A-0 356 419. The process of WO 94/06530 has as its object to save energy and proposes for this purpose to rotate the rotor more slowly.

SUMMARY OF THE INVENTION

It is the object of the present invention to provide a plant and a process for the production of cellulose films and fibres using as a starting material a suspension of pulp in an aqueous amine-oxide solution, said suspension exhibiting a dry substance density of not more than 10% by mass of dry pulp. This kind of starting material has a high water content and thus a low consistency.

The plant according to the invention for the production of cellulose films and fibres according to the amine-oxide process substantially comprises the following parts:

- a mixing device for the production of a first suspension of pulp in an aqueous amine-oxide solution, which suspension has a dry substance density of not more than 10% by mass of dry pulp;
- a device for the concentration of the first pulp suspension produced in the mixing device, wherein the pulp suspension is mechanically spread like a layer on a heating surface, heated and transported across said heating surface while intensively mixing it and evaporating water, until a predetermined amount of water has evaporated and a concentrated pulp suspension is produced;
- a further device, preferably a thin-film treatment apparatus, wherein the produced concentrated pulp suspension is transformed into a mouldable solution of cellulose and
- an additional device connected to said further device or said thin-film treatment apparatus, wherein the mouldable cellulose solution is processed to cellulose films, fibres etc.

It has been shown that when processing a suspension of very humid pulp, i.e. pulp having a water content of more than 10% by mass, in an aqueous amine-oxide solution or when processing a suspension of pulp in an amine-oxide solution having a very high water content, it is convenient to first suspend the pulp homogeneously in the aqueous amine-oxide solution by using a mixing device, said suspending being carried out without evaporating any water, then to transfer the homogeneous suspension to a further device to concentrate it by means of the film technique, particularly the thin-film technique, to produce a concentrated suspension, and then to transfer the concentrated suspension to a third device, wherein it is transformed into a solution.

A preferred embodiment of the plant according to the invention is characterized in that the device for the concentration of the first pulp suspension is a thin-film treatment apparatus.

If in the plant according to the invention a discontinuously operating mixing device is used, there should be provided at least two such mixing devices feeding the continuously operating thin-film treatment apparatus alternatively. Thus a continuous overall operation of the plant can be assured.

Another preferred embodiment of the plant according to the invention is characterized in that as a mixing device a device capable of defibrating and/or grinding pulp is provided. Such machines include machines of the hollander type, Jordan mills, refiners, disk mills and pulpers. Grinding consists in the processing of pulp between one moving and one fixed machine component.

Further, the invention is concerned with an integrated film and fibre plant for the production of cellulose films and fibres according to the amine-oxide process, said plant substantially comprising:

a plant for the production of pulp; and a plant according to the invention for the production of cellulose films and fibres as described herein, said plant being provided downstream to the plant for the production of pulp.

The plant for the production of pulp usually starts from cellulose-containing raw materials, particularly wood. To produce pulp, the cellulose-containing raw material is first subjected to a chemical disintegration, attendant materials such as lignine and hemicellulose going into solution. Then the resulting pulp is purified and bleached.

A preferred embodiment of the integrated film and fibre plant according to the invention consists in that the plant for the production of pulp is designed in such a way that it is able to produce humid pulp having a water content of at least 20% by mass of water, based on the pulp. In this embodiment of the plant according to the invention, the pulp is not dried before being processed to a suspension, and thus the cellulose in the aqueous amine-oxide may be ground in a less aggresive way, later dissolving more easily.

Moreover, the invention is concerned with a process for the production of cellulose films and fibres according to the amine-oxide process, comprising:

suspending pulp in an aqueous amine-oxide solution to produce a first suspension with a dry substance density of not more than 10% by mass of dry pulp;

concentrating this first pulp suspension by mechanically spreading the pulp suspension like a layer on a heating surface, heating and transporting it across said heating surface while intensively mixing it and evaporating water, until a concentrated pulp suspension is produced;

producing a mouldable cellulose solution by heating the concentrated pulp suspension and transforming it into a mouldable cellulose solution while evaporating water; and processing said mouldable cellulose solution in a known way to fibres, films or other moulded bodies;

provided that the concentration of the first pulp suspension and the production of the mouldable cellulose solution are carried out in different devices.

A preferred embodiment of the process according to the invention is to transform the concentrated pulp suspension into a cellulose solution by mechanically spreading the suspension like a layer on a heating surface, heating it and transporting it across this heating surface while intensively mixing it and evaporating water, until the mouldable cellulose solution is produced.

In the process according to the invention, a humid pulp having a water content of at least 20% by mass is preferably used for the production of the first suspension.

Another preferred embodiment of the process according to the invention is to suspend the pulp in the aqueous amine-oxide solution by means of grinding previously shredded pulp in the aqueous amine-oxide solution. It has been shown that a wet grinding in the presence of the amine-oxide disintegrates or activates the pulp in such an appropriate way that the subsequent production of the solution is achieved more readily.

The wet grinding of cellulose as such is known from CA-PS 914674. Its object is to improve the disintegration of pulp which subsequently is to be transformed into cellulose acetate for the chemical reaction.

The wet grinding consists in cutting, fibrillating and swelling the cellulose fibres. By fibrillation, those skilled in the art mean the splicing of the fibres parallel to the fibre axis. After grinding, a substantial portion of the fibrils sticks to the fibres like fringes.

Preferably, the concentrated suspension has a dry substance density of not less than 12% by mass of dry pulp.

The process according to the invention may be carried out continuously.

In the process according to the invention for the production of cellulose films and fibres, as an amine-oxide most preferably N-methylmorpholine-N-oxide is used.

DETAILED DESCRIPTION OF THE PREFERRED EMBODIMENTS

Figure 1:
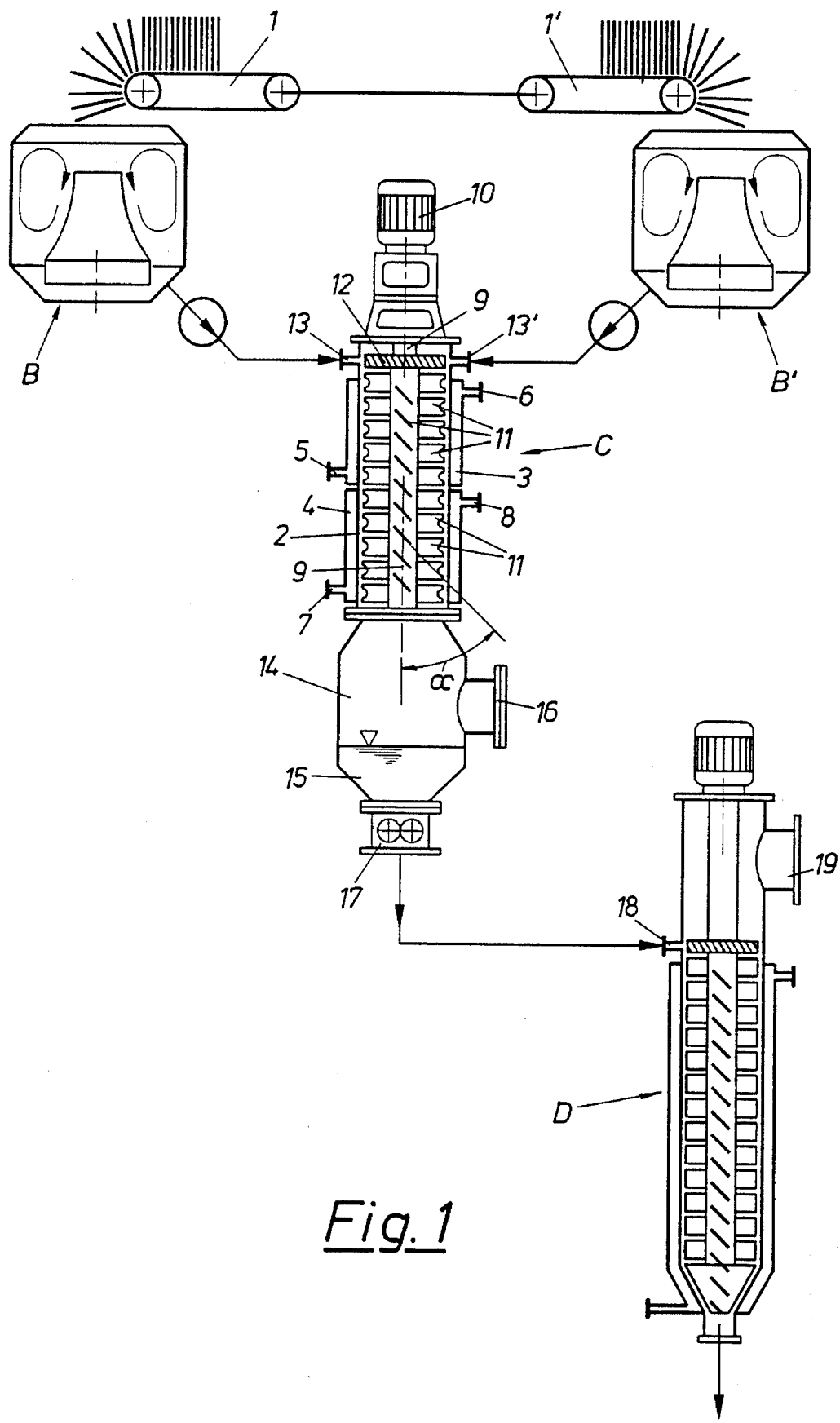
FIG. 1 shows a schematic view of a first embodiment of a plant for the production of films and fibres according to the invention.

In FIG. 1, B and B' respectively denote two so-called pulpers as used for paper production. In paper production, pulpers are used to prepare a fibre paste from pulp and water, from which fibre paste finally paper is made. Pulpers which may be used in the plant according to the invention are available for instance from the company Cellwood Grubbens AB under the product name flat pulper of the W type or vertical pulper of the SRM type. In the illustrated embodiment of the plant according to the invention, the pulpers B, B' are used to prepare the first suspension from pulp and aqueous amine-oxide solution, which suspension is concentrated in thin-film treatment apparatus C and then transformed into a mouldable solution in thin-film treatment apparatus D. From thin-film treatment apparatus D, the mouldable solution is withdrawn and processed to films, fibres or other moulded bodies in a known way. This processing is not illustrated in FIG. 1.

The mode of operation of this plant is as follows:

First, a predetermined amount of aqueous amine-oxide is placed in pulper B. Then pulp, in the present case as sheet pulp, is added to the pulper B by means of a belt weigher 1 while operating the rotor until the desired dry substance density is reached. Preferred dry substance densities are from 4 to 10% by mass of pulp. Subsequently, the pulp is processed in the pulper for some 15–30 minutes while operating the rotor to produce a homogeneous first suspension.

This homogeneous first suspension is fed to the thin-film treatment apparatus C, for instance a FILMTRUDER® of the HS/HSG type of the company Buss AG, Switzerland. The illustration chosen for the drawing is typical of a FILMTRUDER® (see e.g. Erich Heimgartner, "Devolatilisation of Plastics", in Ingenieurwissen, pages 69–97, Düsseldorf 1980, VDI-Verlag GmbH). FIG. 1 shows a partial longitudinal section of the apparatus. 2 denotes the internal wall of a preferably upright rotational body, which in the exemplary embodiment illustrated is designed as a cylindrical container almost over its entire length. For the major part, the internal wall 2 is surrounded by a heating jacket 3, 4 having connection means 5, 6, 7 and 8 for heating medium, the connection means 6 and 8 serving to supply the heating medium (saturated vapor) and the connection means 5 and 7 serving to withdraw it.

9 denotes a rotor having rotor blades 11 connected thereto driven by motor 10. The rotor blades 11, which are plain in the exemplary embodiment illustrated, extend radially to the axis, their plane enclosing an angle of inclination α relative to the axis of rotor 9, the size of the latter preferably being adjustable. In part of the rotor blades 11, this angle may be 0°.

Above the rotor blades 11, a distribution ring 12 is attached to the rotor 9, which ring spreads the cellulose suspension introduced through intake 13, 13' in layers on the internal wall 2. Thus the distribution ring 12 is provided at the level of the intake 13, 13'. The rotor blades 11 have a radial clearance from the internal wall 2 of the container over the total extension of the container, which clearance is 20 mm at most and may be constant or may vary over the length of the container 2.

At its lower end, the container is frustoconically tapered, leading into a receptacle 14 for the concentrated pulp suspension 15. A device for stirring the concentrated suspension in receptacle 14 may be provided by e.g. joining a stirrer to the rotor, which stirrer protrudes into the suspension in receptacle 14 (not shown). The level of the suspension in receptacle 14 may be supervised by means of a radioactive level indicator.

Further, an opening 16 is provided for evacuating the container and for drawing off water vapor. The concentrated pulp suspension is discharged by means of a discharge pump 17 and introduced into the thin-film treatment apparatus D, which may be e.g. a FILMTRUDER® of the HS 0200 type manufactured by Buss AG, Switzerland.

The thin-film treatment apparatus C functions in the following manner:

The first pulp suspension is continuously fed through the intake 13 into the container being under a reduced pressure, is seized there by the distribution ring 12, is spread on the internal wall 2 and is transported by the rotor blades 11 along the indirectly heated internal wall 2 serving as heating surface, to the outlet at the lower end of the container. Heat carrier media such as water, oil or vapor are suited for indirect heating.

The suspension is heated during its transportation along the indirectly heated internal wall 2, and simultaneously water evaporates due to the reduced pressure, so that the suspension becomes concentrated. Due to constant circulation and mixing of the cellulose suspension within the thin film, water can be removed in a very short period of time. The water vapor is withdrawn preferably in the same direction the pulp suspension is being transported.

Since the thin-film treatment apparatus C is operating continuously and the pulper is operating discontinuously, a second pulper B' is provided producing pulp suspension in counteroperation to pulper B, so that the apparatus C may be operated without interruption.

The concentrated pulp suspension discharged from thin-film treatment apparatus C is fed into Filmtruder D and processed to a solution in a known way. The production of the solution is described in EP-A-0 356 419. To produce the solution, the suspension is introduced through intake 18 into the Filmtruder. Filmtruder D is designed essentially the same way as Filmtruder C: the fed suspension is seized by a distribution ring and transported along a heating surface by the rotor blades and heated, while simultaneously further water is evaporated under reduced pressure, until according to the ternary phase diagram cellulose/amine-oxide/water (see e.g. WO94/28212) the pulp dissolves. The water vapor is withdrawn in opposite direction to the transportation direction of the suspension. The withdrawing opening for the water vapor is indicated by 19.

The final mouldable cellulose solution is discharged from the Filmtruder D by means of a discharge pump (not shown), fed e.g. to a spinning machine in a known way and processed to fibres. Appropiate processes for the production of fibres and films are known for instance from WO 93/19230 and WO 95/07811 respectively of the applicant.

Figure 2:
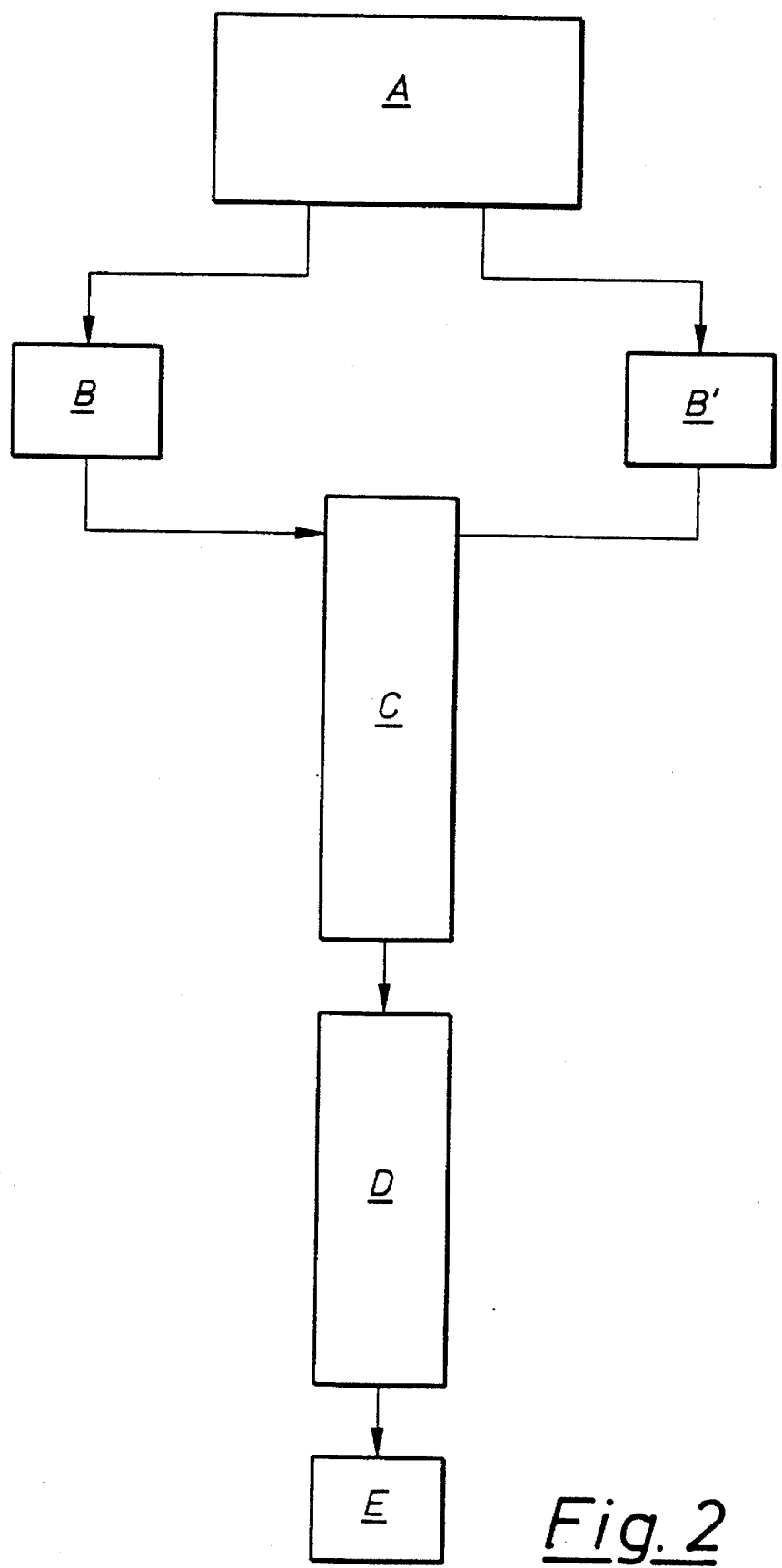
FIG. 2 shows a schematic view of an integrated film and fibre plant according to the invention.

FIG. 2 schematically shows an embodiment of the film and fibre plant according to the invention, A denoting a plant for the production of preferably humid pulp. B, B', C and D denote the pulpers and Filmtruders represented in FIG. 1. E indicates known devices for the production of fibres, films or other moulded bodies.

By means of the following Example, the production of a mouldable cellulose solution will be described.

EXAMPLE 100 kg of humid pulp of the "Lenzing BKZ EM 9 feucht" type containing 50% of water was suspended for about 5 minutes in a pulper of the company Cellwood Grubbens AB (vertical pulper) in 600 kg of a commercially available solution of N-methylmorpholine-N-oxide having an NMMO content of approximately 58% by mass. A homogeneous pulp suspension having a dry substance density of 8, 33% by mass of pulp was obtained.

This suspension (58° C.) was fed into a FILMTRUDER® of the Buss HS/HSG 0200 type at a rate of 600 kg/h and therein concentrated to a dry substance density of 12, 38% by mass of pulp. The heating surface of the FILMTRUDER® was heated by means of saturated vapor at 160° C. The circumferential rate of the rotor was 4 m/s. Approximately 404 kg of concentrated suspension per hour having a temperature of 85° C. could be withdrawn from the FILMTRUDER®.

The concentrated suspension was fed into the FILMTRUDER® of the Buss HS 0200 type at a temperature of 80° C. at a rate of about 404 kg/h, therein further concentrated and finally transformed into a mouldable solution having a cellulose concentration of 15, 0%. The heating surface of the FILMTRUDER® was heated by means of saturated vapor at 142° C. The circumferential rate of the rotor was 4 m/s. Approximately 333 kg of mouldable cellulose solution per hour having a temperature of 105° C. could be withdrawn from the FILMTRUDER®.

We claim:

1. A plant for the production of cellulose films, fibres and other moulded bodies according to an amine-oxide process, said plant comprising:

a pulper for the production of a first suspension of pulp in an aqueous amine-oxide solution, said first pulp suspension having a dry substance density of not more than 10% by mass of dry pulp;

a first thin-film treatment apparatus for receiving said first pulp suspension, the thin film treatment apparatus including an evacuatable vessel having a heated internal surface, means for spreading pulp on the heated internal surface, and means for transporting pulp across the heated surface, the pulp suspension being mechanically spread like a layer on a heating surface, heated and transported across said heating surface while being intensively mixed and evaporating water, until a predetermined amount of water has evaporated, thereby producing a concentrated pulp suspension;

a second thin-film treatment apparatus wherein the concentrated pulp suspension from said first device is transformed into a mouldable solution of cellulose; and means for moulding cellulose solutions connected to receive the output from said second device, in which the mouldable cellulose solution is processed to form cellulose films, fibres and other moulded bodies.

2. A plant according to claim 1, wherein at least two pulpers are connected to said first thin-film treatment apparatus by means of a conduit.

3. A plant according to claim 1, wherein said pulper includes a moving and fixed component and is capable of defibrating and grinding pulp.

4. An integrated film and fibre plant for the production of cellulose films, fibres and other moulded bodies according to an amine-oxide process, said plant substantially comprising:

a plant for the production of pulp; and a plant for the production of cellulose films, fibres and other moulded bodies according to claim 1, said plant for the production of cellulose films fibres and other moulded bodies being provided downstream to said plant for the production of pulp.

5. An integrated film and fibre plant according to claim 4, wherein said pulp has a water content of at least 20% by mass.

6. A process for the production of cellulose films, fibres and other moulded bodies according to an amine-oxide process, comprising the steps of:

suspending pulp in an aqueous amine-oxide solution to produce a first suspension with a dry substance density of not more than 10% by mass of dry pulp;

concentrating said first pulp suspension by mechanically spreading the pulp suspension into a layer on a heating surface, heating and transporting said layer of pulp suspension across said heating surface while intensively mixing said layer of pulp suspension and evaporating water, thereby producing a concentrated pulp suspension;

producing a mouldable cellulose solution by heating the concentrated pulp suspension and evaporating water from the concentrated pulp suspension so as to transform the concentrated pulp suspension into a mouldable cellulose solution; and processing said mouldable cellulose solution to form fibres, films or other moulded bodies, wherein said concentration of said first pulp suspension and said production of said mouldable cellulose solution are carried out in different devices.

7. A process according to claim 6, wherein said mouldable cellulose solution is produced by mechanically spreading the concentrated pulp suspension into a layer on a heating surface, heating and transporting said layer of concentrated pulp suspension across said heating surface while intensively mixing said layer of concentrated pulp suspension and evaporating water thereby producing a mouldable cellulose solution.

8. A process according to claim 6 or claim 7, wherein said first suspension comprises a humid pulp having a water content of at least 20% by mass.

9. A process according to claim 6 or claim 7, wherein said suspending pulp step in the aqueous amine-oxide solution comprises defibrating and grinding previously shredded pulp in said aqueous amine-oxide solution.

10. A process according to claim 6 or claim 7, wherein said concentrated suspension has a dry substance density of not less than 12% by mass of dry pulp.

11. A process according to claim 6 or claim 7, wherein said process is carried out continuously.

12. A process for the production of cellulose films, fibres and other moulded bodies according to any one of claims 6 or 7, wherein the amine-oxide is N-methylmorpholine-N-oxide.

13. A plant according to claim 2, wherein said at least two pulpers are connected to said first thin-film treatment apparatus by means of a conduit.

14. A plant according to claim 2, wherein said pulper includes a moving and fixed component and is capable of defibrating and grinding pulp.

15. A plant according to claim 13, wherein said pulper includes a moving and fixed component and is capable of defibrating and grinding pulp.

16. An integrated film and fibre plant according to claim 4, wherein at least two pulpers are connected to said first thin-film treatment apparatus by means of a conduit.

17. An integrated film and fibre plant according to claim 4, wherein at least two pulpers are connected to said first device by means of a conduit.

18. An integrated film and fibre plant according to claim 4, wherein said pulper includes a moving and fixed component and is capable of defibrating and grinding pulp.

19. An integrated film and fibre plant according to claim 16, wherein said pulpers include a moving and fixed component and are capable of defibrating and grinding pulp.

20. An integrated film and fibre plant according to claim 17, wherein said pulpers include a moving and fixed component and are capable of defibrating and grinding pulp.

21. A process according to claim 8, wherein said suspending pulp step comprises defibrating and grinding previously shredded pulp in said aqueous amine-oxide solution.

22. A process according to claim 8, wherein said concentrated suspension has a dry substance density of not less than 12% by mass of dry pulp.

23. A process according to claim 9, wherein said concentrated suspension has a dry substance density of not less than 12% by mass of dry pulp.

24. A process according to claim 21, wherein said concentrated suspension has a dry substance density of not less than 12% by mass of dry pulp.

25. A process according to claim 8, wherein said process is carried out continuously.

26. A process for the production of cellulose films, fibres and other moulded bodies according to claim 8, wherein the amine-oxide is N-methylmorpholine-N-oxide.

27. A process for the production of cellulose films, fibres and other moulded bodies according to claim 9, wherein the amine-oxide is N-methylmorpholine-N-oxide.

28. A process for the production of cellulose films, fibres and other moulded bodies according to claim 21, wherein the amine-oxide is N-methylmorpholine-N-oxide.

* * * * *

UNITED STATES PATENT AND TRADEMARK OFFICE
CERTIFICATE OF CORRECTION

PATENT NO. : 5,603,883
DATED : February 18, 1997
INVENTOR(S) : Stefan ZIKELI

It is certified that error appears in the above-indentified patent and that said Letters Patent is hereby corrected as shown below:

Col. 1, line 5, "present" should read --The present--

Col. 6, line 14, "Appropiate" should read --Appropriate--

Col. 7, line 28, "films fibres" should read --films, fibres--

Signed and Sealed this

Eighth Day of July, 1997

*Attest:*

BRUCE LEHMAN

*Attesting Officer*     *Commissioner of Patents and Trademarks*